US010628975B2

(12) United States Patent
Liu et al.

(10) Patent No.: US 10,628,975 B2
(45) Date of Patent: Apr. 21, 2020

(54) METHOD AND APPARATUS FOR GENERATING AND UPDATING TILES MAPS IN VIRTUAL MAPS

(71) Applicant: Alibaba Group Holding Limited, George Town (KY)

(72) Inventors: Huan Liu, Hangzhou (CN); Rongyan Zheng, Hanzghou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/393,802

(22) Filed: Apr. 24, 2019

(65) Prior Publication Data
US 2019/0251717 A1 Aug. 15, 2019

Related U.S. Application Data

(63) Continuation of application No. PCT/CN2017/116547, filed on Dec. 15, 2017.

(30) Foreign Application Priority Data

Dec. 20, 2016 (CN) .......................... 2016 1 1184141

(51) Int. Cl.
*G06F 16/51* (2019.01)
*G06T 11/20* (2006.01)
(Continued)

(52) U.S. Cl.
CPC .......... *G06T 11/20* (2013.01); *A63F 13/5378* (2014.09); *A63F 13/65* (2014.09);
(Continued)

(58) Field of Classification Search
CPC ............................ G06T 19/003; G06F 3/04815
See application file for complete search history.

(56) References Cited

U.S. PATENT DOCUMENTS

2007/0013708 A1 * 1/2007 Barcklay ............... G06F 3/0485
345/557
2007/0115288 A1  5/2007 Cronin et al.
(Continued)

FOREIGN PATENT DOCUMENTS

CN  101635705  1/2010
CN  101820445  9/2010
(Continued)

OTHER PUBLICATIONS

Extended European Search Report in European Application No. 17883542.7, dated Sep. 30, 2019, 8 pages.
(Continued)

*Primary Examiner* — Phi Hoang
(74) *Attorney, Agent, or Firm* — Fish & Richardson P.C.

(57) ABSTRACT

Implementations of the present application describe updating tile maps in virtual maps, including the following. A central area in which a virtual object is located is determined in a first area. The first area comprises an area of a map that includes tile maps loaded into a virtual map including the virtual object. A border of the central area is located in the first area. A distance parameter is determined after the virtual object moves out of the central area. The distance parameter indicates relative distances of a tile map containing the virtual object relative to the central area in x-axis and y-axis directions. A loading status of a tile map not shared by the first area and a second area is updated based on the distance parameter. The second area comprises a map area determined after moving the first area based on the distance parameter.

21 Claims, 11 Drawing Sheets

(51) Int. Cl.
*A63F 13/5378* (2014.01)
*G09B 29/00* (2006.01)
*A63F 13/65* (2014.01)
*H04L 29/06* (2006.01)
*A63F 13/00* (2014.01)

(52) U.S. Cl.
CPC ........... *G06F 16/51* (2019.01); *G09B 29/007* (2013.01); *A63F 13/00* (2013.01); *G06T 2210/08* (2013.01); *H04L 67/42* (2013.01)

(56) References Cited

U.S. PATENT DOCUMENTS

| | | | | |
|---|---|---|---|---|
| 2010/0275136 | A1* | 10/2010 | Gower | H04L 67/38 715/757 |
| 2011/0239229 | A1* | 9/2011 | Meijer | G06F 9/467 719/318 |
| 2011/0316854 | A1 | 12/2011 | Vandrovec | |
| 2012/0173606 | A1* | 7/2012 | Becker | G01C 21/32 709/203 |
| 2013/0283318 | A1 | 10/2013 | Wannamaker | |
| 2013/0293575 | A1 | 11/2013 | Kunigita et al. | |
| 2013/0325317 | A1* | 12/2013 | Pylappan | G01C 21/26 701/409 |
| 2014/0067988 | A1* | 3/2014 | Noronha | H04L 67/10 709/213 |
| 2014/0282768 | A1* | 9/2014 | Michael | H04N 21/23106 725/93 |
| 2017/0123750 | A1* | 5/2017 | Todasco | G06F 3/1454 |

FOREIGN PATENT DOCUMENTS

| | | |
|---|---|---|
| CN | 101841910 | 9/2010 |
| CN | 102750180 | 10/2012 |
| CN | 102819530 | 12/2012 |
| CN | 103208225 | 7/2013 |
| CN | 103984720 | 8/2014 |
| CN | 104142926 | 11/2014 |
| CN | 104281709 | 1/2015 |
| CN | 105359189 | 2/2016 |
| CN | 105989130 | 10/2016 |
| CN | 106021436 | 10/2016 |
| CN | 106227864 | 12/2016 |
| CN | 107016924 | 8/2017 |

OTHER PUBLICATIONS

Palmer et al., Gamedev.net [online], "Tile Based Games FAQ," Sep. 1999, retrieved on Sep. 30, 2019, retrieved from URL<https://www.gamedev.net/articles/programming/general-and-gameplay-programming/tile-based-games-faq-version-12-r728/>, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT Written Opinion of the International Searching Authority in Internaitonal Application No. PCT/CN2017/116547. dated Mar. 14, 2018, 13 pages (with English translation).
PCT International Preliminary Report on Patentability in International Application No. PCT/CN2017/116547, dated Jun. 25, 2019, 14 pages (with English Translaiton).
Fuzhong et al., "The Research of Map Publishing platform Development Based on the Tile Pyramid Technology," Geomatics & Spatial Information Technology, 2010, 33(5), ISSN: 1672-5857, pp. 16, 17, and 20 (with English Abstract).
International Search Report and Written Opinion in International Application No. PCT/CN2017/116547, dated Mar. 14, 2018, 14 pages (with partial English translation).

* cited by examiner

| (m, 0) | (m, 1) | (m, 2) | ••• | (m, n) |
|---|---|---|---|---|
| ••• | ••• | ••• | ••• | ••• |
| (2, 0) | (2, 1) | (2, 2) | ••• | (2, n) |
| (1, 0) | (1, 1) | (1, 2) | ••• | (1, n) |
| (0, 0) | (0, 1) | (0, 2) | ••• | (0, n) |

FIG. 2

Coordinates in a virtual map

Latitude and longitude

METHOD AND APPARATUS FOR GENERATING AND UPDATING TILES MAPS IN VIRTUAL MAPS

CROSS-REFERENCE TO RELATED APPLICATIONS

This application is a continuation of PCT Application No. PCT/CN2017/116547, filed on Dec. 15, 2017, which claims priority to Chinese Patent Application No. 201611184141.9, filed on Dec. 20, 2016, and each application is hereby incorporated by reference in its entirety.

TECHNICAL FIELD

The present application relates to the field of image processing, and in particular, to a method and an apparatus for generating and updating tiles maps in virtual maps.

BACKGROUND

Due to a large data amount in a map, the map needs to be partially loaded through slicing, namely, a tile map technology, to ensure a map loading speed in a client and reduce server load.

When an actual map such as Baidu Map or Auto Navi Map is used to generate a virtual map in a virtual application, because the actual map has a large size, the virtual map generated based on the actual map is also very large, and if all tile maps in the virtual map are loaded at a time, great pressure is brought to performance and memory of the virtual application, resulting in poor display efficiency of the virtual map.

How to improve display efficiency of the virtual map is a technical problem that needs to be dealt with in implementations of the present application.

SUMMARY

To alleviate the previous technical problem, the implementations of the present application are implemented as follows:

According to a first aspect, a method for updating tile maps in virtual maps is provided. The method includes the following: determining, in a first area, a central area that a virtual object is located in, where the first area is an area map that includes tile maps loaded into a virtual map that the virtual object is located in, a border of the central area is located in the first area, a maximum distance between any tile map in the central area and the virtual object in an x-axis direction in a tile map coordinate system of the virtual map is less than $X_1$, a maximum distance between any tile map in the central area and the virtual object in a y-axis direction in the tile map coordinate system is less than $Y_1$, a length of one tile map is used as a unit on the x-axis in the tile map coordinate system, a width of one tile map is used as a unit on the y-axis in the tile map coordinate system, and $X_1$ and $Y_1$ are predetermined positive integers; and determining a distance parameter after the virtual object moves out of the central area, and updating a loading status of a tile map not shared by the first area and a second area based on the distance parameter and the first area, where the distance parameter indicates relative distances of a tile map that the virtual object is located in relative to the central area in the x-axis direction and the y-axis direction in the tile map coordinate system, and the second area is a map area determined after moving the first area based on the distance parameter.

According to a second aspect, a method for generating tile maps in virtual maps is provided. The method includes the following: determining a map area of a virtual map based on a scaling relationship between an actual electronic map and the virtual map; dividing the map area into a plurality of equally sized tile areas; and performing image processing on each tile area based on an area map that corresponds to the tile area in the actual electronic map, to generate a tile map of the tile area, where the image processing includes rendering processing.

According to a third aspect, an apparatus for drawing a virtual map is provided, including a determining unit and an updating unit. The determining unit determines, in a first area, a central area that a virtual object is located in, where the first area is an area map that includes tile maps loaded into a virtual map that the virtual object is located in, a border of the central area is located in the first area, a maximum distance between any tile map in the central area and the virtual object in an x-axis direction in a tile map coordinate system of the virtual map is less than $X_1$, a maximum distance between any tile map in the central area and the virtual object in a y-axis direction in the tile map coordinate system is less than $Y_1$, a length of one tile map is used as a unit on the x-axis in the tile map coordinate system, a width of one tile map is used as a unit on the y-axis in the tile map coordinate system, and $X_1$ and $Y_1$ are predetermined positive integers. The determining unit further determines a distance parameter after the virtual object moves out of the central area, where the distance parameter indicates relative distances of a tile map that the virtual object is located in relative to the central area in the x-axis direction and the y-axis direction in the tile map coordinate system. The updating unit updates a loading status of a tile map not shared by the first area and a second area based on the distance parameter and the first area, where the second area is a map area determined after moving the first area based on the distance parameter.

According to a fourth aspect, an apparatus for drawing a virtual map is provided, including: a determining unit, configured to determine a map area of a virtual map based on a scaling relationship between an actual electronic map and the virtual map; an area division unit, configured to divide the map area into a plurality of equally sized tile areas; and an image processing unit, configured to perform image processing on each tile area based on an area map that corresponds to the tile area in the actual electronic map, to generate a tile map of the tile area, where the image processing includes rendering processing.

It can be seen from the technical solutions provided in the implementations of the present application that, in the implementations of the present application, after the virtual object moves out of the central area that the virtual object is located in, a tile map whose loading status needs to be updated is determined based on a distance parameter of a tile map that the virtual object moves to relative to the central area and a currently loaded tile map. Therefore, loading redundant tile maps can be alleviated to implement seamless connection between the tile maps, and efficiency of displaying the virtual map and an experience effect are improved to an extent.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description show merely some implementations of the present application, and a person of ordinary skill in the art can still derive other drawings from these accompanying drawings without creative efforts.

FIG. 2 is a schematic diagram illustrating area division and coordinates of tile maps, according to an implementation of the present application;

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. Apparently, the described implementations are merely some rather than all of the implementations of the present application. All other implementations obtained by a person of ordinary skill in the art based on the implementations of the present application without creative efforts shall fall within the protection scope of the present application.

Figure 1:
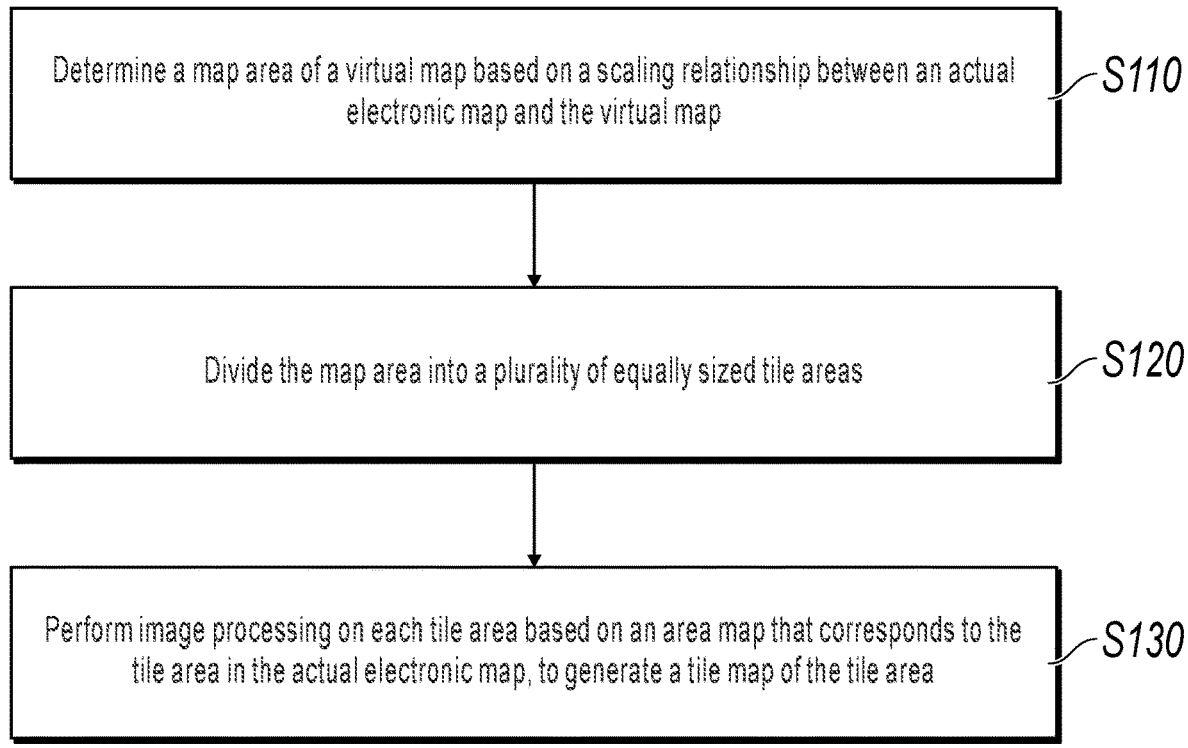
FIG. 1 is a flowchart illustrating a method for generating tile maps in virtual maps, according to an implementation of the present application.

FIG. 1 is a flowchart illustrating a method for generating tile maps in virtual maps, according to an implementation of the present application. The method in FIG. 1 is performed by an apparatus for generating tile maps in virtual maps. In specific applications, the apparatus for generating tile maps in virtual maps can be a graphics engine of a virtual map, for example, a 2D graphics engine, a 3D graphics engine, or another virtual map drawing tool. Implementations are not limited in the present application. Specifically, the virtual map can be a 2D map or a 3D map. The method in FIG. 1 can include the following steps.

S110. Determine a map area of a virtual map based on a scaling relationship between an actual electronic map and the virtual map.

It should be understood that the actual electronic map in the implementation of the present application is an electronic map such as Baidu Map or Auto Navi Map drawn based on an actual environment.

It should be understood that the virtual map in the implementation of the present application is a map such as a virtual map in a virtual application.

It should be understood that, in the implementation of the present application, a size of the virtual map can be determined based on a scaling relationship between the actual electronic map and the virtual map.

For example, it is predetermined that the relationship between the actual electronic map and the virtual map is 2:1. In this case, a length and a width of the actual electronic map can be separately shortened by half to determine the size of the virtual map.

S120. Divide the map area into a plurality of equally sized tile areas.

Specifically, the map area can be divided into the plurality of equally sized tile areas.

Preferably, the tile areas can be rectangular, for example, 10 cm×10 cm, 5 cm×5 cm, and 4 cm×2 cm. It should be understood that a length and a width of a tile area are not necessarily equal. Certainly, preferably, the length and the width of the tile area are equal to each other.

Certainly, it should be understood that the tile area can alternatively be in another shape, for example, the tile area can be a rhombus or a regular hexagon. In this case, an edge of the virtual map may not be an even straight line.

S130. Perform operations including image processing on each tile area based on an area map that corresponds to the tile area in the actual electronic map, to generate a tile map of the tile area.

The image processing operation includes rendering processing.

For example, assume that the actual electronic map is an electronic map generated based on a campus of a university. In this case, rendering processing is performed on each tile area in a virtual map based on an area map that corresponds to the tile area in the electronic map that corresponds to the university, and a tile map of the tile area can be generated.

Certainly, it should be understood that other image processing operations than the rendering processing can be performed on the virtual map based on the electronic map. Implementations are not limited in the present application.

In the implementation of the present application, the area of the virtual map is determined based on the actual electronic map, the virtual map is divided into a plurality of equally sized tile areas, and rendering processing is performed on the tile areas based on corresponding area maps of the tile areas in the actual electronic map, so that a tile map of the virtual map can be generated fast based on the actual electronic map, thereby improving efficiency of generating the virtual map.

Optionally, in the implementation of the present application, step S130 is specifically implemented as follows: determining a first actual area map that corresponds to a first tile area in the plurality of equally sized tile areas in the actual electronic map based on a size of the tile area and an index of the first tile area, and performing image processing on the first tile area based on the first actual area map to obtain a first tile map that corresponds to the first tile area.

An index of each tile area is related to a position of the tile area. Specifically, for example, the index of the tile area can be point coordinates of a specified position in the tile area. For example, when the tile area is rectangular, the coordinates can be center coordinates of the tile area, lower left vertex coordinates of the tile area, upper left vertex coordinates of the tile area, upper right vertex coordinates of the tile area, lower right vertex coordinates of the tile area, etc. The index can alternatively be a number of the tile area, etc.

Certainly, it should be understood that, before step S130, the method further includes the following: creating an index of a tile area based on a position of the tile area.

Figure 3:
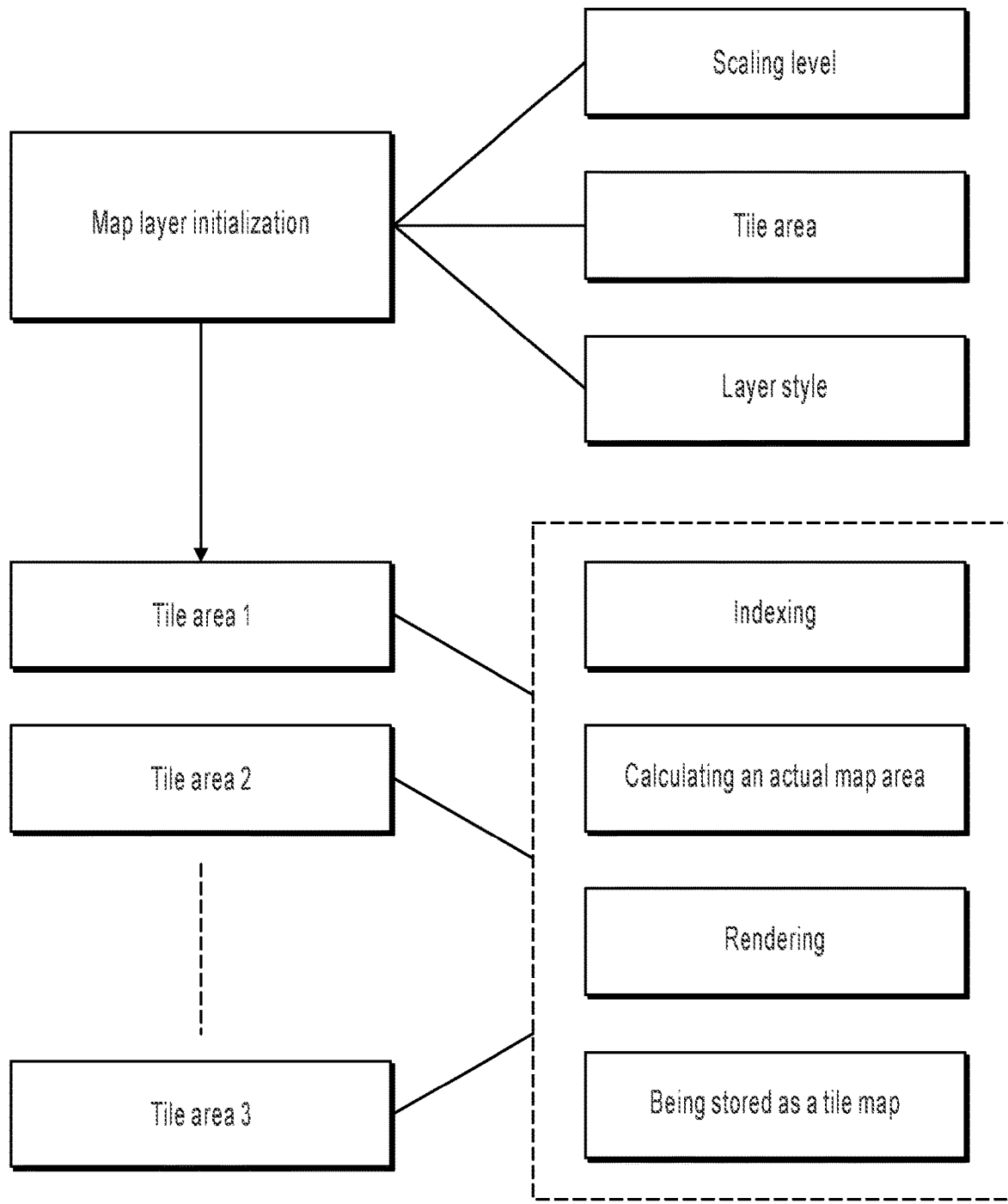
FIG. 3 is a schematic diagram illustrating a method for generating tile maps in virtual maps, according to an implementation of the present application.

The method in the implementation of the present application is further described with reference to FIG. 2 and FIG. 3.

In the implementation of the present application, when a virtual map needs to be generated based on an actual electronic map, an area size of the virtual map can be determined based on a scaling relationship between the actual electronic map and the virtual map. Especially, when the virtual map is a 3D virtual map, because a size of the 3D virtual map is generally unchanged, a scaling ratio of the 3D virtual map to the actual electronic map is generally a constant value.

After a virtual map area is determined based on the actual electronic map and the scaling relationship, the virtual map can be divided into a plurality of equally sized rectangular areas. Each rectangular area has a size of one tile map, and one rectangular area can be referred to as one tile area. FIG. 2 is a schematic diagram illustrating area division and coordinates of tile maps, according to an implementation of the present application. Assume that an entire area shown in FIG. 2 is an entire virtual map area determined based on the actual electronic map. As shown in FIG. 2, the virtual map can be divided into a plurality of equally sized tile areas. In addition, an index can be created for each tile area based on a position of the tile area. For example, coordinates or a sequence number can be used to represent the index of the tile area. In the implementation shown in FIG. 2, a length of one tile area is used as a unit of measurement for horizontal coordinates, and a width of one tile area is used as a unit of measurement for vertical coordinates.

After tile area division is completed and the index is created, image processing including the rendering processing can be performed based on the actual electronic map to obtain the tile map. FIG. 3 is a schematic diagram illustrating a method for generating tile maps in virtual maps, according to an implementation of the present application. As shown in FIG. 3, layer initialization first needs to be performed on the tile area. Specifically, the virtual map area that corresponds to the actual electronic map can be determined based on a scaling level, and then the virtual map area is divided into tile areas. In addition, when layer initialization is performed on the tile area, usually layer styles in the tile area can be initialized, for example, what color a road is, and whether a building is displayed. For ease of identifying and locating a tile area, the tile area can be further indexed.

After layer initialization on the tile area is completed, an actual area that corresponds to the tile area in the actual electronic map can be calculated based on an index and a size of the tile area. As shown in FIG. 2, the tile areas are adjacently arranged on a two-dimensional plane, and all the tile areas have the same size. Two-dimensional coordinates of each tile area can be determined based on an index of the tile area (or the index of the tile area is the two-dimensional coordinates). Then, latitude and longitude of a rectangular area covered by each tile area can be determined based on the size of the tile area. In other words, the actual area that corresponds to the tile area in the actual electronic map can be determined.

After the actual area that corresponds to the tile area in the actual electronic map is obtained, layers in the tile area can be processed based on an actual area map. For example, a third-party map API (such as Google Map) can be called to render map pictures in the tile area based on the actual area map. Finally, the pictures are stored, and a tile map is obtained. The index of the tile area can be used as an index of the tile map.

Certainly, it should be understood that the tile area can alternatively be in another shape, for example, the tile area can be a rhombus or a regular hexagon. When the shape changes, an algorithm for calculating an actual map area based on the index and the size of the tile area changes accordingly.

Figure 4:
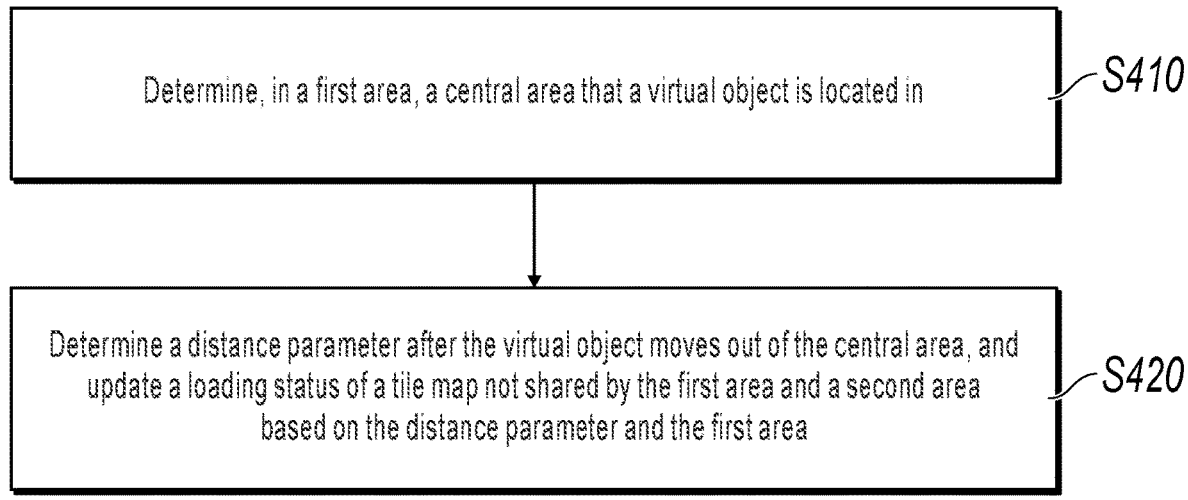
FIG. 4 is a schematic diagram illustrating a method for updating tile maps in virtual maps, according to an implementation of the present application.

FIG. 4 is a flowchart illustrating a method for updating tile maps in virtual maps, according to an implementation of the present application. The method in FIG. 4 is performed by a virtual map drawing apparatus. In specific applications, the virtual map drawing apparatus can be a graphics engine, for example, a 2D graphics engine, a 3D graphics engine, or another virtual map drawing tool. Implementations are not limited in the present application. It should be understood that the virtual map in the implementation of the present application can be a virtual map such as a 3D virtual map or a 2D virtual map, or another map in a virtual application, etc. The method in FIG. 4 can include the following steps.

S410. Determine, in a first area, a central area that a virtual object is located in.

The first area is an area map that includes tile maps loaded into a virtual map that the virtual object is located in. A border of the central area is located in the first area. A maximum distance between any tile map in the central area and the virtual object in an x-axis direction in a tile map coordinate system of the virtual map is less than $X_1$. A maximum distance between any tile map in the central area and the virtual object in a y-axis direction in the tile map coordinate system is less than $Y_1$. A length of one tile map is used as a unit on the x-axis in the tile map coordinate system, a width of one tile map is used as a unit on the y-axis in the tile map coordinate system, and $X_1$ and $Y_1$ are predetermined positive integers.

It should be understood that a specific form of the virtual object is not limited in the implementation of the present application. A 3D game is used as an example for description. For example, the virtual object can be a character or a vehicle driven by a character in the 3D game.

It should be understood that all tile maps have the same size in the implementation of the present application.

It should be understood that, in the implementation of the present application, the loaded first area should cover a visual field of the virtual object. In other words, all tile maps in the visual field of the virtual object should be loaded. In the implementation of the present application, the first area at least includes the tile maps in the visual field of the virtual object. Certainly, it should be understood that the first area can also be greater than the visual field of the virtual object.

Figure 5:
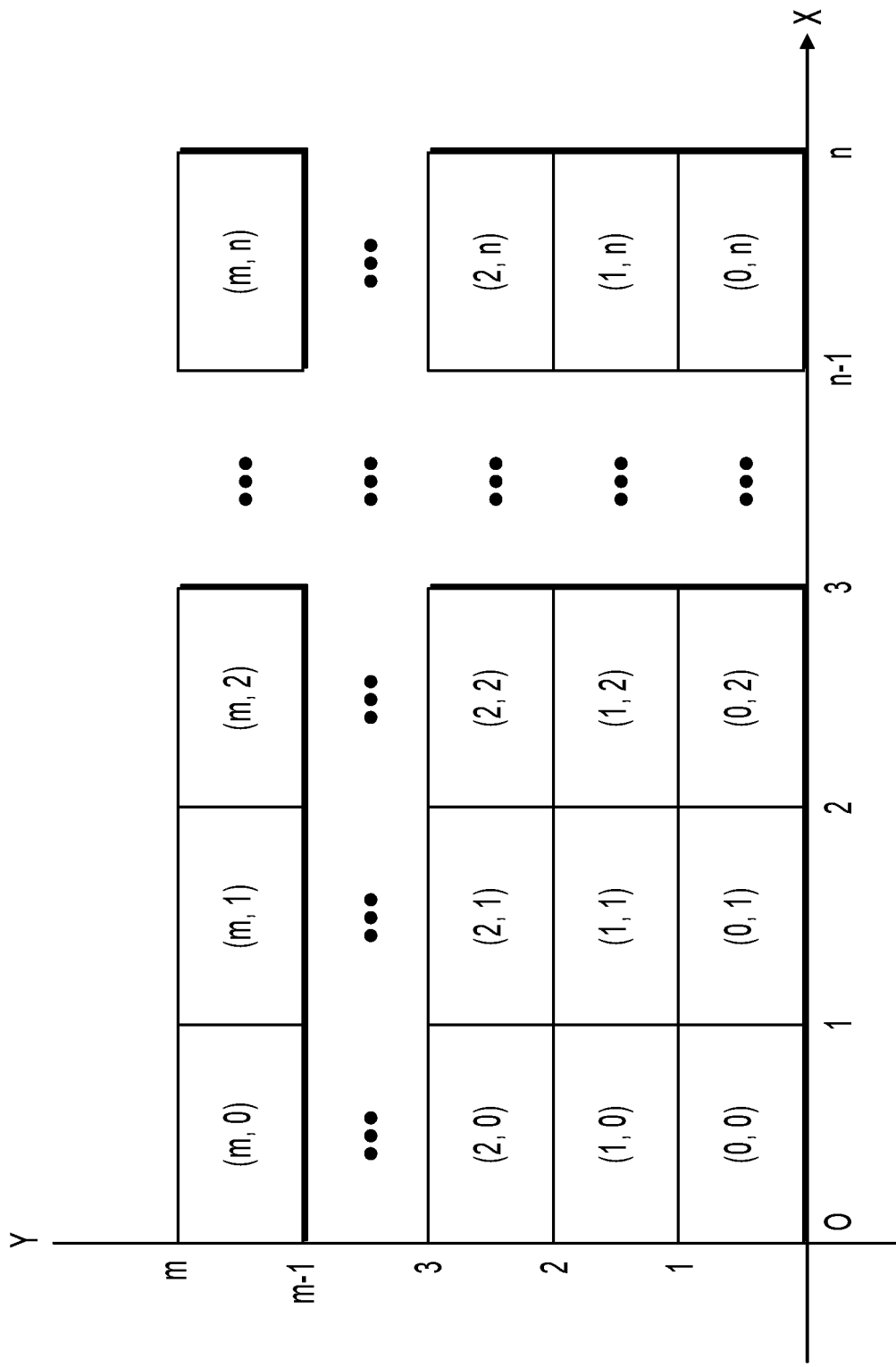
FIG. 5 is a schematic diagram illustrating tile maps in a virtual map in a tile map coordinate system, according to an implementation of the present application.

It should be understood that, in the implementation of the present application, a length of one tile map is used as a unit on the x-axis in the tile map coordinate system, and a width of one tile map is used as a unit on the y-axis in the tile map coordinate system. FIG. 5 is a schematic diagram illustrating tile maps in a virtual map in a tile map coordinate system, according to an implementation of the present application. As shown in FIG. 5, each rectangular area is a tile map. A length of the tile map is used as a unit on the x-axis (x-axis) in the tile map coordinate system, and a width of the tile map is used as a unit on the y-axis (y-axis) in the tile map coordinate system.

In addition, position coordinates can alternatively be used as an index of the tile map. For example, in the tile map coordinate system shown in FIG. 5, lower left vertex coordinates of the tile map are used as the index of the tile map.

S420. Determine a distance parameter after the virtual object moves out of the central area, and update a loading status of a tile map not shared by the first area and a second area based on the distance parameter and the first area.

The distance parameter indicates relative distances of a tile map that the virtual object is located in relative to the central area in the x-axis direction and the y-axis direction in the tile map coordinate system, and the second area is a map area determined after moving the first area based on the distance parameter.

It should be understood that the second area is the map area determined after moving the first area based on the distance parameter. Therefore, the first area and the second area have the same shape and the same size. For example, in FIG. 2, assume that the first area is a rectangular area that includes (2, 0) and (1, 1), and the distance parameter indicates that the first area moves to the right by one tile map. In this case, the second area is a rectangular area that includes (2, 1) and (1, 2), and has the same shape and size as those of the first area.

It should be understood that a tile map not shared by the first area and the second area is a tile map that exists in either only the first area or only the second area.

In the implementation of the present application, after the virtual object moves out of the central area that the virtual object is located in, the virtual object moves in to a tile map, and a distance parameter of the tile map that is relative to the central area is determined. Then, a tile map whose loading status needs to be updated is determined based on the distance parameter of the tile map and a currently loaded tile map. Therefore, loading redundant tile maps can be alleviated to implement seamless connection between the tile maps, and efficiency of displaying the virtual map and an experience effect are improved to an extent.

Optionally, in an implementation, the determining a distance parameter in step S420 can be specifically implemented in the following method: determining that the distance parameter is (1, 0) when the virtual object moves to a tile map that is on the right of the central area and adjacent to the central area; or determining that the distance parameter is (1, 1) when the virtual object moves to a tile map that is at the upper right of the central area and adjacent to the central area; or determining that the distance parameter is (0, 1) when the virtual object moves to a tile map that is right above the central area and adjacent to the central area; or determining that the distance parameter is (−1, 1) when the virtual object moves to a tile map that is at the upper left of the central area and adjacent to the central area; or determining that the distance parameter is (−1, 0) when the virtual object moves to a tile map that is on the left of the central area and adjacent to the central area; or determining that the distance parameter is (−1, −1) when the virtual object moves to a tile map that is at the lower left of the central area and adjacent to the central area; or determining that the distance parameter is (0, −1) when the virtual object moves to a tile map that is right below the central area and adjacent to the central area; or determining that the distance parameter is (1, −1) when the virtual object moves to a tile map that is at the lower right of the central area and adjacent to the central area, where in the tile map coordinate system, a right direction is a positive direction for horizontal coordinates, and an upward direction is a positive direction for vertical coordinates.

It should be understood that, in the implementation of the present application, the distance parameter (a, b) indicates that the central area moves to the right by a tile maps and upward by b tile maps, and a and b are integers. When a value of a or b is a negative number, it indicates that the central area moves in an opposite direction; or when the value of a or b is 0, it indicates that the central area does not move.

Optionally, in another implementation, the determining a distance parameter in step S420 can be specifically implemented in the following method: determining a second central area, where after the virtual object moves out of the central area, a maximum distance, in the x-axis direction in the tile map coordinate system of the virtual map, between any tile map in the second central area and the tile map that the virtual object is located in is less than $X_1$, and a maximum distance, in the y-axis direction in the tile map coordinate system of the virtual map, between the tile map in the second central area and the tile map that the virtual object is located in is less than $Y_1$; and determining that a relative distance of the second central area relative to the central area in the x-axis direction and the y-axis direction in the tile map coordinate system is the distance parameter.

Optionally, in an implementation, step 420 is specifically implemented as follows: determining the distance parameter after the virtual object moves out of the central area for a time duration that exceeds a preset time, and updating the loading status of the tile map not shared by the first area and the second area based on the distance parameter and the first area.

In the implementation of the present application, the tile map is updated after the virtual object moves out of the central area for a predetermined time, so that frequently updating the tile map is alleviated when the virtual object moves between critical areas in a short time.

Optionally, in an implementation, in step 420, the updating a loading status of a tile map not shared by the first area and a second area is specifically implemented as follows: loading added tile maps in the second area relative to tile maps in the first area, and removing reduced tile maps in the second area relative to tile maps in the first area.

In the implementation of the present application, a tile map that does not need to be displayed is removed, and a tile map that needs to be displayed is loaded, so that efficiency of loading the tile map can be increased, seamless connection between the tile maps is implemented, and efficiency of displaying the virtual map and an experience effect are improved to an extent.

Optionally, in an implementation, in step 420, the updating a loading status of a tile map not shared by the first area and a second area based on the distance parameter and the first area is specifically implemented as follows: determining an index of a tile map that needs to be updated based on the distance parameter and indexes of tile maps in the first area; and updating a loading status of a tile map of the virtual object in the virtual map based on the index of the tile map that needs to be updated.

Preferably, $X_1$ is equal to $Y_1$. Further, a value of $X_1$ can be 1, 2, 3, 4, 5, etc.

Optionally, a maximum distance, in the x-axis direction, between any tile map in the first area and the tile map that the virtual object is located in is less than $X_2$ times a first unit length, and a maximum distance, in the y-axis direction, between the tile map in the first area and the tile map that the virtual object is located in is less than $Y_2$ times a second unit length, where $X_2$ and $Y_2$ are positive integers, and $X_1 < X_2$ and $Y_1 < Y_2$. Preferably, the first area and the central area are rectangular. Further, $Y_2 = Y_1 + 1$, and $X_2 = X_1 + 1$. In this case, a new rectangular area is generated by separately extending the periphery of the central area upward and downward and to the left and the right by one tile map, and the new rectangular area is the first area.

For example, when values of $X_1$ and $Y_1$ are 1, values of $X_2$ and $Y_2$ are 2. In this case, tile maps loaded for the virtual object are a nine-rectangular-grid map, and the virtual object is always located in the center of the nine-rectangular-grid map.

For another example, when values of $X_1$ and $Y_1$ are 2, values of $X_2$ and $Y_2$ are 3. In this case, tile maps loaded for the virtual object are a sixteen-rectangular-grid map, and the virtual object is always located on four tile maps in the center of the sixteen-rectangular-grid map.

For another example, when values of $X_1$ and $Y_1$ are 3, values of $X_2$ and $Y_2$ are 4. In this case, tile maps loaded for the virtual object are a twenty-five-rectangular-grid map, and the virtual object is always located on nine tile maps in the center of the twenty-five-rectangular-grid map.

Optionally, in an implementation, before step S420, the method further includes the following: determining corresponding map coordinates of the virtual object in the virtual map based on latitude and longitude of an actual object that corresponds to the virtual object in an actual environment, where the virtual map is generated based on an actual electronic map.

For example, assume that a global electronic map is used as a virtual map in a game. In this case, when logging in to the game on Tian'anmen Square in Beijing, a user is located at 39°54'27" N, 116°23'17" E. In this case, the user is located in the game at a position in the virtual map that corresponds to the position (39°54'27" N, 116°23'17" E) in the actual electronic map.

After corresponding map coordinates of the virtual object in the virtual map is determined based on latitude and longitude of an actual object that corresponds to the virtual object in an actual environment, an initial position of the virtual object in a virtual application can be determined, and whether the virtual object moves out of a current central area can be further determined.

Optionally, in an implementation, before step S420, the method further includes the following: determining a corresponding moving direction and moving distance of the virtual object in the virtual map based on a moving direction and a moving distance of an actual object that corresponds to the virtual object in an actual environment, where the virtual map is generated based on an actual electronic map.

For example, still assume that a global electronic map is used as a virtual map in a game, currently, a user is on Tian'anmen Square 39°54'27" N, 116°23'17" E in Beijing, and a corresponding coordinate position in the virtual map is $(x_0, y_0)$. Assume that the user moves to the west by 50 kilometers, a distance that corresponds to one kilometer in the virtual map is 1 cm, and directions of the virtual map are as follows: upper north, lower south, left west, and right east. In this case, the user can determine that a position of the virtual object is a position obtained after the coordinates $(x_0, y_0)$ move to the left by 50 cm in the virtual map.

A moved position can be determined based on a current position, a moving distance, and a moving direction of the virtual object in the virtual map so as to determine whether the virtual object moves out of the current central area.

The following further describes the method in the implementations of the present application with reference to a specific implementation.

Figure 6:
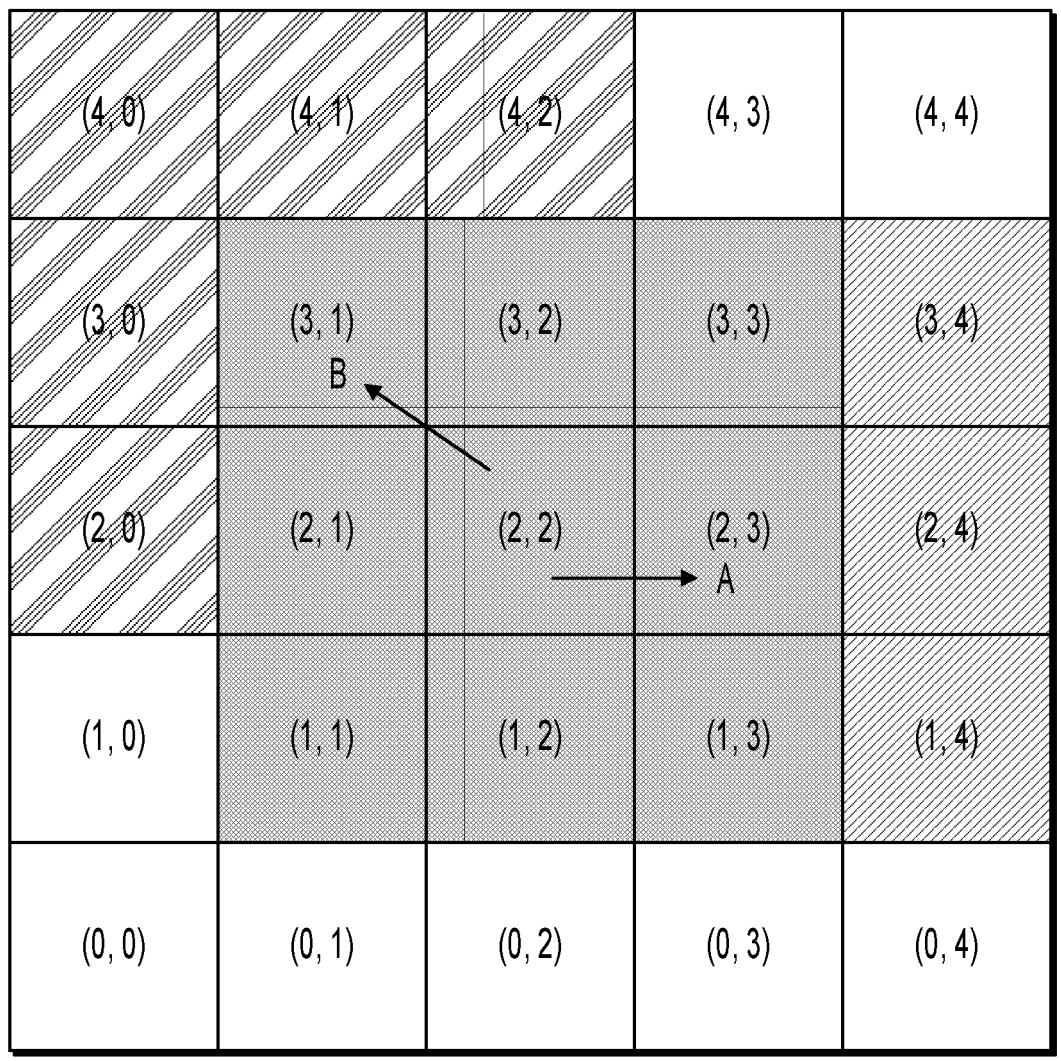
FIG. 6 is a schematic diagram illustrating coordinates of some tile maps in a virtual map, according to an implementation of the present application.

FIG. 6 is a schematic diagram illustrating coordinates of some tile maps in a virtual map, according to an implementation of the present application. In FIG. 6, tile maps loaded by a player character are a nine-rectangular-grid map in a gray part. In the implementation shown in FIG. 6, two-dimensional coordinates of a tile map in a virtual map is used as an index of the tile map. The two-dimensional coordinates of the tile map in the virtual map can be center coordinates of the tile map, coordinates of a vertex of the tile map, coordinates of a fixed position in the tile map, etc.

In a scenario shown in FIG. 6, when values of $X_1$ and $Y_1$ in the implementation shown in FIG. 4 are 1, values of $X_2$ and $Y_2$ are 2. In this case, a first area of a virtual object includes tile maps (1, 1), (1, 2), (1, 3), (2, 1), (2, 2), (2, 3), (3, 1), (3, 2), and (3, 3), and a central area of the virtual object includes a tile map (2, 2). It should be understood that, when the virtual object moves in the central area, no tile map needs to be updated, and when the virtual object moves out of the central area, a tile map needs to be updated.

As an arrow A in FIG. 6 shows, it can be determined that a distance parameter is (0, 1) when the virtual object moves to a tile map (2, 3) from the central area, that is, the tile map (2, 2). In this case, coordinates of tile maps that need to be loaded for the virtual object are (1, 2), (1, 3), (1, 4), (2, 2), (2, 3), (2, 4), (3, 2), (3, 3), and (3, 4). In other words, loading statuses of tile maps that are not shared by the tile maps (1, 1), (1, 2), (1, 3), (2, 1), (2, 2), (2, 3), (3, 1), (3, 2), and (3, 3) and the tile maps (1, 2), (1, 3), (1, 4), (2, 2), (2, 3), (2, 4), (3, 2), (3, 3), and (3, 4) need to be updated. In other words, coordinate indexes of tile maps whose loading statuses need to be updated are (1, 1), (2, 1), (3, 1), (1, 4), (2, 4), and (3, 4). The tile maps (1, 1), (2, 1), and (3, 1) need to be removed, and the tile maps (1, 4), (2, 4), and (3, 4) need to be loaded.

As an arrow B in FIG. 6 shows, when the virtual object moves to a tile map (3, 1) from the tile map (2, 2), it can be determined that the distance parameter is (1, −1). In this case, coordinates of tile maps that need to be loaded for the virtual object are (2, 0), (2, 1), (2, 2), (3, 0), (3, 1), (3, 2), (4, 0), (4, 1), and (4, 2). In other words, loading statuses of tile maps that are not shared by the tile maps (2, 0), (2, 1), (2, 2), (3, 0), (3, 1), (3, 2), (4, 0), (4, 1), and (4, 2) and the tile maps (1, 1), (1, 2), (1, 3), (2, 1), (2, 2), (2, 3), (3, 1), (3, 2), and (3, 3) need to be updated. In other words, loading statuses of tile maps (2, 0), (3, 0), (4, 0), (4, 1), (4, 2), (1, 1), (1, 2), (1, 3), (2, 3), and (3, 3) need to be updated. To be specific, the tile maps (1, 1), (1, 2), (1, 3), (2, 3), and (3, 3) need to be removed, and the tile maps (2, 0), (3, 0), (4, 0), (4, 1), and (4, 2) need to be loaded.

Certainly, it should be understood that the virtual object can alternatively move to other six directions in the nine-rectangular-grid map from the tile map (2, 2). A movement distance parameter of the virtual object is shown by the distance parameter in the implementation shown in FIG. 4. Details are omitted in the implementation of the present application for simplicity.

In addition, it should be understood that a predetermined time can be further set to alleviate frequent map refreshing because of frequent switching. A tile map is updated after the virtual object moves out of the central area for the predetermined time. In this way, frequent refreshing because of frequent map switching can be alleviated to improve user experience.

Certainly, it should be understood that other indexes can alternatively be used as indexes of tile maps in actual applications. For example, a numerical index is determined based on coordinates. Specifically, for example, if coordinates of a tile map is $(x_0, y_0)$, a numerical index of the tile map is $a*x_0+b*y_0$.

In addition, it should be understood that the central area of the virtual object can include more than one tile map. For example, when values of $X_1$ and $Y_1$ are 2, values of $X_2$ and $Y_2$ are 3. The central area includes four tile maps, and tile maps that need to be loaded constitute a sixteen-rectangular-grid map. Similar to a nine-rectangular-grid map, in the sixteen-rectangular-grid map, areas other than the central area can also be divided into eight areas that respectively correspond to eight directions: right, upper right, right above, upper left, left, lower left, right below, and lower right. A method for calculating a movement distance parameter in the sixteen-rectangular-grid map is similar to that in the nine-rectangular-grid map.

In addition, a quantity of tile maps included in the central area in the y-axis direction can be unequal to a quantity of tile maps included in the central area in the x-axis direction. For example, a value of $X_1$ is 1, a value of $Y_1$ is 2, and values of $X_2$ and $Y_2$ are 3.

In addition, a shape of the first area including the tile maps loaded for the virtual object is also not limited in the implementation of the present application, as long as the first area includes the central area of the virtual object and the central area is not on an edge of the first area. Preferably, the first area and the central area are rectangular.

For example, in the tile maps shown in FIG. 6, the first area can include the nine-rectangular-grid map in the gray part and an area including tile maps (4, 0), (4, 1), (4, 2), (4, 3), and (4, 4).

To determine an area that needs to be updated, it only needs to compare the first area with a second area obtained after moving the first area based on the distance parameter, and update a loading status of a tile map in an area not shared by the first area and the second area.

In a preferable solution, the first area is an area obtained by extending the central area by one tile map in all directions.

In addition, it should be understood that, in the method in the implementation of the present application, an association relationship can be further established between position information of a user in an actual environment and position information of the virtual object in the virtual map.

In a specific example, a virtual map can be generated based on an actual electronic map, and then corresponding map coordinates of the virtual object in the virtual map are determined based on latitude and longitude of an actual object that corresponds to the virtual object in an actual environment. It should be understood that the virtual map generated based on the actual electronic map corresponds to the latitude and longitude in the actual environment.

Figure 7:
FIG. 7 is a schematic diagram illustrating a mapping relationship between coordinates in a virtual map and latitude and longitude in an actual electronic map, according to an implementation of the present application.
Figure 7:
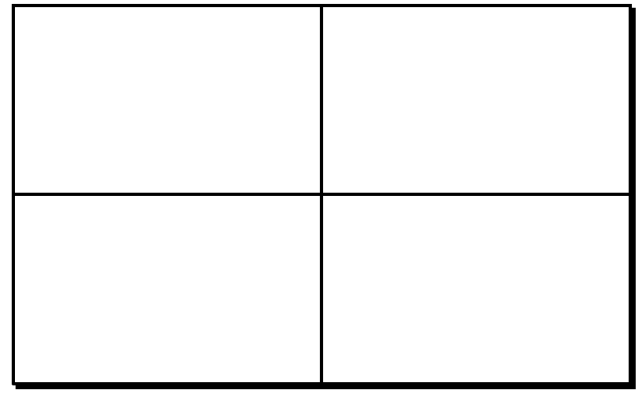

For example, assume that the virtual map is a 3D game map, the virtual object is a game character in a 3D game, and a map origin corresponds to latitude and longitude in the actual electronic map, that is, (0, 0) corresponds to latitude and longitude (O-lat, O-lng). Assume that a length and a width of a tile map in a 3D graphics engine are respectively w and h, and latitude and longitude actually covered by the tile map are respectively d-lat and d-lng, as shown in FIG. 7. FIG. 7 is a schematic diagram illustrating a mapping relationship between coordinates in a virtual map and latitude and longitude in an actual electronic map, according to an implementation of the present application.

If current latitude and longitude of the user in the actual environment is (x, y), a coordinate index of a tile map that a game character corresponding to the user is located in is as follows:

$$\left(\left[\frac{x-O_{lat}}{d_{lat}}\right], \left[\frac{y-O_{lng}}{d_{lng}}\right]\right).$$

Further, it can be obtained that coordinates (the z-axis is ignored) of the game character in the 3D graphics engine are as follows:

$$\left(\frac{x-O_{lat}}{d_{lat}}w, \frac{y-O_{lng}}{d_{lng}}h\right).$$

Correspondingly, the latitude and longitude of the user in the actual environment can also be calculated based on the coordinates of the game character in the 3D graphics engine.

In addition, it should be understood that, in the method in the implementation of the present application, an action of the user in the actual environment can be further associated with an action of the virtual object.

In a specific example, based on an action parameter of the actual object that corresponds to the virtual object in the actual environment, a corresponding action parameter of the virtual object in the virtual map can be determined, and the virtual object can be operated. Specifically, the action parameter can be a parameter related to movement of a part such as a hand, a foot, the head, or the body of the user. For example, an arm swing distance, an arm swing speed, a leg lifting angle, a leg lifting direction, and a leg lifting speed of the user in the actual environment can be captured by using a sensor. Certainly, the sensor can also be used to collect relatively simpler data, such as a moving distance, a moving direction, and a moving speed of the user.

Certainly, it should be understood that the method for determining the coordinates in the virtual map based on the latitude and longitude and the method for determining the action parameter of the virtual object in the virtual map based on the action parameter in the actual environment can be applied to the same implementation. The virtual object and the user maintain good consistency based on latitude and longitude data and action parameter data of the user, making virtual experience of the user more real.

Figure 8:
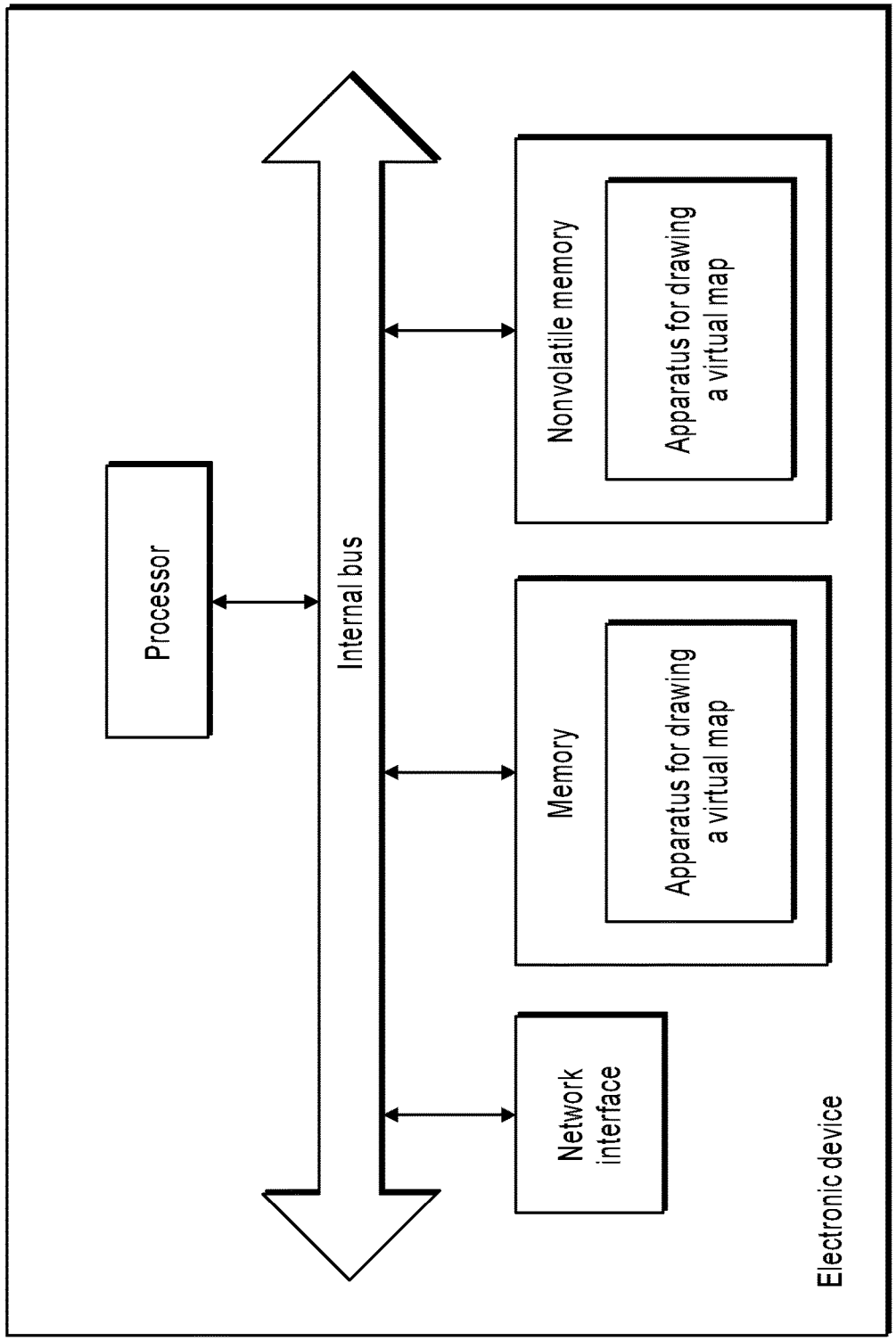
FIG. 8 is a schematic structural diagram illustrating an electronic device, according to an example implementation of the present application.

FIG. 8 is a schematic structural diagram illustrating an electronic device, according to an example implementation of the present application. Referring to FIG. 8, in terms of hardware, the electronic device includes a processor, an internal bus, a network interface, a memory, and a nonvolatile memory, and certainly can further include hardware needed by other services. The processor reads a corresponding computer program from the nonvolatile memory to the memory for running, and a user interface unlocking apparatus is logically formed. Certainly, in addition to a software implementation, the present application does not exclude another implementation, for example, a logic device or a combination of hardware and software. That is, an execution body of the following processing procedure is not limited to each logical unit, and can also be hardware or a logic device.

Figure 9:
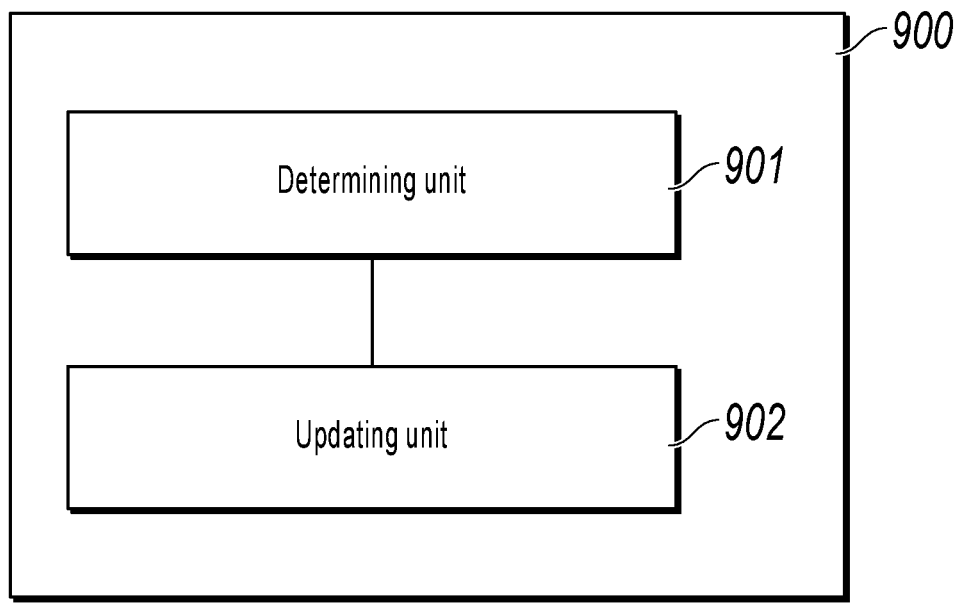
FIG. 9 is a schematic structural diagram illustrating an apparatus for drawing a virtual map, according to an implementation of the present application.

FIG. 9 is a schematic structural diagram illustrating an apparatus 900 for drawing a virtual map, according to an implementation of the present application. Referring to FIG.

9, in a software implementation, the apparatus 900 for drawing a virtual map can include a determining unit 901 and an updating unit 902.

The determining unit 901 determines, in a first area, a central area that a virtual object is located in, where the first area is an area map that includes tile maps loaded into a virtual map that the virtual object is located in, a border of the central area is located in the first area, a maximum distance between any tile map in the central area and the virtual object in an x-axis direction in a tile map coordinate system of the virtual map is less than $X_1$, a maximum distance between any tile map in the central area and the virtual object in a y-axis direction in the tile map coordinate system is less than $Y_1$, a length of one tile map is used as a unit on the x-axis in the tile map coordinate system, a width of one tile map is used as a unit on the y-axis in the tile map coordinate system, and $X_1$ and $Y_1$ are predetermined positive integers.

The determining unit 901 further determines a distance parameter after the virtual object moves out of the central area, where the distance parameter indicates relative distances of a tile map that the virtual object is located in relative to the central area in the x-axis direction and the y-axis direction in the tile map coordinate system.

The updating unit 902 updates a loading status of a tile map not shared by the first area and a second area based on the distance parameter and the first area, where the second area is a map area determined after moving the first area based on the distance parameter.

In the implementation of the present application, after the virtual object moves out of the central area that the virtual object is located in, the virtual object moves in to a tile map, and a distance parameter of the tile map that is relative to the central area is determined. Then, a tile map whose loading status needs to be updated is determined based on the distance parameter of the tile map and a currently loaded tile map. Therefore, loading redundant tile maps can be alleviated to implement seamless connection between the tile maps, and efficiency of displaying the virtual map and an experience effect are improved to an extent.

Optionally, the determining unit 901 is specifically configured to: determine that the distance parameter is (1, 0) when the virtual object moves to a tile map that is on the right of the central area and adjacent to the central area; or determine that the distance parameter is (1, 1) when the virtual object moves to a tile map that is at the upper right of the central area and adjacent to the central area; or determine that the distance parameter is (0, 1) when the virtual object moves to a tile map that is right above the central area and adjacent to the central area; or determine that the distance parameter is (−1, 1) when the virtual object moves to a tile map that is at the upper left of the central area and adjacent to the central area; or determine that the distance parameter is (−1, 0) when the virtual object moves to a tile map that is on the left of the central area and adjacent to the central area; or determine that the distance parameter is (−1, −1) when the virtual object moves to a tile map that is at the lower left of the central area and adjacent to the central area; or determine that the distance parameter is (0, −1) when the virtual object moves to a tile map that is right below the central area and adjacent to the central area; or determine that the distance parameter is (1, −1) when the virtual object moves to a tile map that is at the lower right of the central area and adjacent to the central area, where the distance parameter (a, b) indicates that the central area moves to the right by a tile maps and upward by b tile maps, and x and y are integers.

It should be understood that, in the implementation of the present application, the distance parameter (a, b) indicates that the central area moves to the right by a tile maps and upward by b tile maps, and a and b are integers. When a value of a or b is a negative number, it indicates that the central area moves in an opposite direction; or when the value of a or b is 0, it indicates that the central area does not move.

Optionally, the updating unit 902 is specifically configured to determine the distance parameter after the virtual object moves out of the central area for a time duration that exceeds a preset time, and update the loading status of the tile map not shared by the first area and the second area based on the distance parameter and the first area.

Optionally, the updating unit 902 is specifically configured to load added tile maps in the second area relative to tile maps in the first area, and remove reduced tile maps in the second area relative to tile maps in the first area.

Optionally, the updating unit 902 is specifically configured to determine an index of a tile map that needs to be updated based on the distance parameter and indexes of tile maps in the first area; and update a loading status of a tile map of the virtual object in the virtual map based on the index of the tile map that needs to be updated.

Preferably, $X_1$ is equal to $Y_1$. Further, a value of $X_1$ is 1, 2, 3, 4, or 5.

Optionally, a maximum distance, in the x-axis direction, between any tile map in the first area and the tile map that the virtual object is located in is less than $X_2$ times a first unit length, and a maximum distance, in the y-axis direction, between the tile map in the first area and the tile map that the virtual object is located in is less than $Y_2$ times a second unit length, where $X_2$ and $Y_2$ are positive integers, and $X_1 < X_2$ and $Y_1 < Y_2$. Preferably, the first area and the central area are rectangular. Further, $Y_2 = Y_1 + 1$, and $X_2 = X_1 + 1$. In this case, a new rectangular area is generated by separately extending the periphery of the central area upward and downward and to the left and the right by one tile map, and the new rectangular area is the first area.

Optionally, the determining unit 901 further determines corresponding map coordinates of the virtual object in the virtual map based on latitude and longitude of an actual object that corresponds to the virtual object in an actual environment, where the virtual map is generated based on an actual electronic map.

Optionally, the determining unit 901 further determines a corresponding action parameter of the virtual object in the virtual map and operates the virtual object based on an action parameter of the actual object that corresponds to the virtual object in the actual environment.

The apparatus 900 for drawing a virtual map can further perform the method in FIG. 4, and implement functions of an apparatus for drawing a virtual map, a graphics engine, etc. in the implementations shown in FIG. 4 and FIG. 6. Details are omitted in the implementation of the present application for simplicity.

Figure 10:
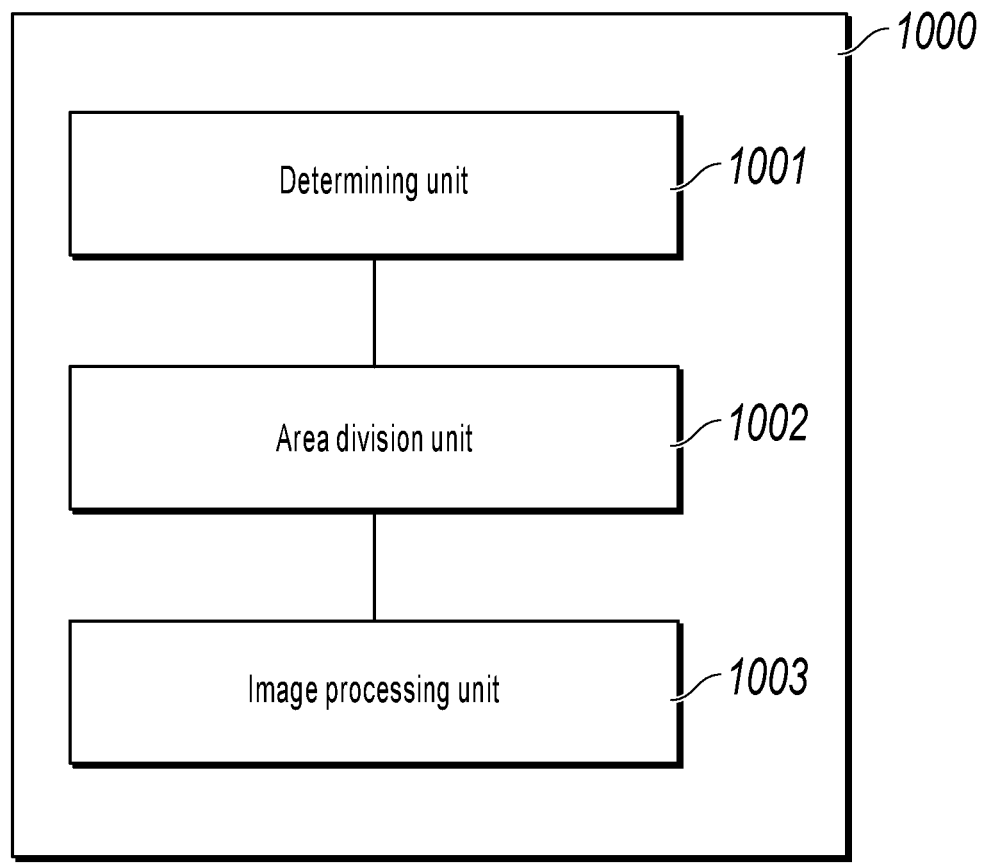
FIG. 10 is a schematic structural diagram illustrating an apparatus for drawing a virtual map, according to another implementation of the present application.

FIG. 10 is a schematic structural diagram illustrating an apparatus 1000 for drawing a virtual map, according to an implementation of the present application. Referring to FIG. 10, in a software implementation, the apparatus 1000 for drawing a virtual map can include a determining unit 1001, an area division unit 1002, and an image processing unit 1003.

The determining unit 1001 is configured to determine a map area of a virtual map based on a scaling relationship between an actual electronic map and the virtual map.

The area division unit 1002 is configured to divide the map area into a plurality of equally sized tile areas.

The image processing unit 1003 is configured to perform image processing on each tile area based on an area map that corresponds to the tile area in the actual electronic map, to generate a tile map of the tile area, where the image processing includes rendering processing.

In the implementation of the present application, the area of the virtual map is determined based on the actual electronic map, the virtual map is divided into a plurality of equally sized tile areas, and rendering processing is performed on the tile areas based on corresponding area maps of the tile areas in the actual electronic map, so that a tile map of the virtual map can be generated fast based on the actual electronic map, thereby improving efficiency of generating the virtual map.

Optionally, the determining unit 1001 further determines a first actual area map that corresponds to a first tile area in the plurality of equally sized tile areas in the actual electronic map based on a size of the tile area and an index of the first tile area, and the image processing unit 1003 further performs image processing on the first tile area based on the first actual area map to obtain a first tile map that corresponds to the first tile area.

Certainly, it should be understood that the area division unit 1002 can further create an index for each tile area in the plurality of equally sized tile areas.

Figure 2:
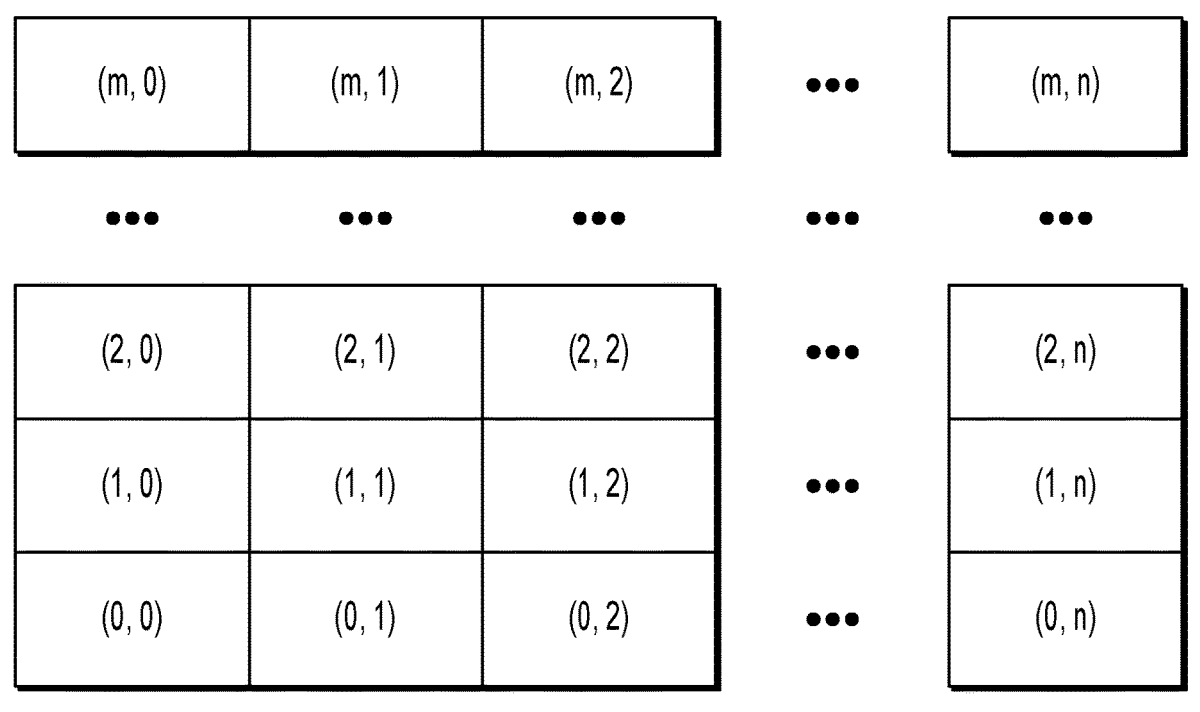

The apparatus 1000 for drawing a virtual map can further perform the method in FIG. 1, and implement functions of an apparatus for drawing a virtual map, a graphics engine, etc. in the implementations shown in FIG. 1 and FIG. 2. Details are omitted in the implementation of the present application for simplicity.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product according to the implementations of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, a built-in processor, or a processor of another programmable data processing device to generate a machine, so that the instructions executed by the computer or the processor of the another programmable data processing device generate an apparatus for implementing a specific function in one or more flows in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more flows in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts in the implementations, refer to the implementations. Each implementation focuses on a difference from other implementations. Particularly, a system implementation is basically similar to a method implementation, and therefore, is described briefly. For related parts, refer to related descriptions in the method implementation.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 11:
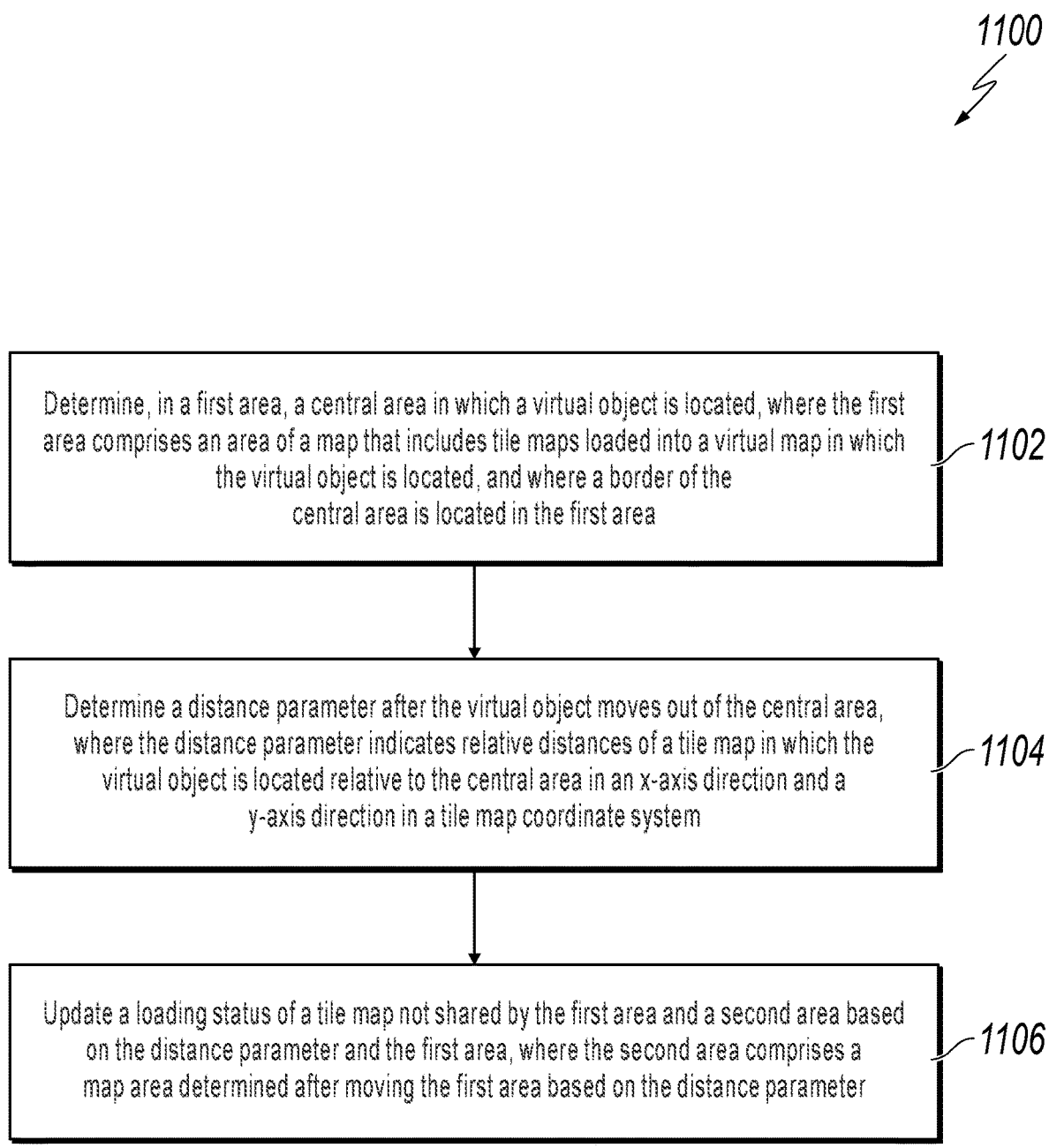
FIG. 11 is a flowchart illustrating an example of a computer-implemented method for updating a loading status of a tile map not shared by two areas, according to an implementation of the present disclosure.

FIG. 11 is a flowchart illustrating an example of a computer-implemented method 1100 for updating a loading status of a tile map not shared by two areas, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a central area in which a virtual object is located is determined in a first area. The first area comprises an area of a map that includes tile maps loaded into a virtual map in which the virtual object is located. A border of the central area is located in the first area. For example, the determining unit 1001 can determine a map area of a virtual map based on a scaling relationship between an actual electronic map and the virtual map.

In some implementations, a maximum distance between any tile map in the central area and the virtual object in the x-axis direction in the tile map coordinate system of the virtual map is less than $X_1$, where $X_1$ represents a predetermined positive integer. For example, as shown in FIG. 5, each rectangular area is a tile map. A length of the tile map is used as a unit on the x-axis in the tile map coordinate system, and a width of the tile map is used as a unit on the y-axis in the tile map coordinate system. Distances between tile maps in the x-axis direction in the tile map coordinate system are limited to a maximum value of x (for example, n) on the x-axis.

In some implementations, a maximum distance between any tile map in the central area and the virtual object in the y-axis direction in the tile map coordinate system is less than $Y_1$, where $Y_1$ represents a predetermined positive integer. For example, a length of one tile map is used as a unit on the x-axis in the tile map coordinate system, and a width of one tile map is used as a unit on the y-axis in the tile map coordinate system. Distances between tile maps in the y-axis direction in the tile map coordinate system are limited to a maximum value of y (for example, m) on the y-axis. From 1102, method 1100 proceeds to 1104.

At 1104, a distance parameter is determined after the virtual object moves out of the central area. The distance parameter indicates relative distances of a tile map in which the virtual object is located relative to the central area in an x-axis direction and a y-axis direction in a tile map coordinate system. For example, as shown in FIG. 5, each rectangular area is a tile map. A length of the tile map is used as a unit on the x-axis in the tile map coordinate system, and a width of the tile map is used as a unit on the y-axis in the tile map coordinate system.

In some implementations, determining the distance parameter can be based on one of eight directions relative to the central area that the virtual object moves to a tile map. The tile map is a rectangular area, and the distance parameter (a, b) that is determined in the eight different directions indicates that the central area moves to the right by a tile maps and upward by b tile maps, and a and b are integers. The distance parameter is determined as (1, 0) when the virtual object moves to a tile map that is on the right of the central area and adjacent to the central area. The distance parameter is determined as (1, 1) when the virtual object moves to a tile map that is at the upper right of the central area and adjacent to the central area. The distance parameter is determined as (0, 1) when the virtual object moves to a tile map that is right above the central area and adjacent to the central area. The distance parameter is determined as (−1, 1) when the virtual object moves to a tile map that is at the upper left of the central area and adjacent to the central area. The distance parameter is determined as (−1, 0) when the virtual object moves to a tile map that is on the left of the central area and adjacent to the central area. The distance parameter is determined as (−1, −1) when the virtual object moves to a tile map that is at the lower left of the central area and adjacent to the central area. The distance parameter is determined as (0, −1) when the virtual object moves to a tile map that is right below the central area and adjacent to the central area. The distance parameter is determined as (1, −1) when the virtual object moves to a tile map that is at the lower right of the central area and adjacent to the central area.

In some implementations, the virtual map can include a 3D game map, and the virtual object can include a game character in a 3D game. For example, determining the corresponding action parameter of the virtual object in the virtual map and operating the virtual object based on the action parameter of the actual object that corresponds to the virtual object in the actual environment include determining a parameter related to movement of a part of a user corresponding to the game character. For example, the movement of the part of the user can be captured using a sensor. Then, the game character can be operated based on the parameter.

In some implementations, method 1100 can further include determining that the virtual object moves out of the central area by determining a moving direction and a moving distance of the virtual object in the virtual map based on a moving direction and a moving distance of the actual object that corresponds to the virtual object in the actual environment. For example, assume that a global electronic map is used as a virtual map in a game, and a user is on Tian'anmen Square 39°54'27" N, 116°23'17" E in Beijing. A corresponding coordinate position in the virtual map is $(x_0, y_0)$. Assume that the user moves to the west by 50 kilometers, and a distance that corresponds to one kilometer in the virtual map is 1 centimeter (cm). Also assume that directions of the virtual map are as follows: upper north, lower south, left west, and right east. In this case, the user can determine that a position of the virtual object is a position obtained after the coordinates $(x_0, y_0)$ move to the left by 50 cm in the virtual map. From 1104, method 1100 proceeds to 1106.

At 1106, a loading status of a tile map not shared by the first area and a second area is updated based on the distance parameter and the first area. The second area comprises a map area determined after moving the first area based on the distance parameter. For example, the updating unit 902 can determine an index of a tile map that needs to be updated based on the distance parameter and indexes of tile maps in the first area. Then, the updating unit 902 can update a loading status of a tile map of the virtual object in the virtual map based on the index of the tile map that needs to be updated. After 1106, method 1100 can stop.

In some implementations, determining the distance parameter and updating the load status can be time-based. For example, determining the distance parameter after the virtual object moves out of the central area and updating the loading status of the tile map not shared by the first area and the second area based on the distance parameter and the first area can include the following. The distance parameter is determined after the virtual object moves out of the central area for a time duration that exceeds a preset time. Then, the loading status of the tile map not shared by the first area and the second area is updated based on the distance parameter and the first area.

In some implementations, updating the loading status of a tile map not shared by the first area and a second area can include loading added tile maps in the second area relative to tile maps in the first area, and removing reduced tile maps in the second area relative to tile maps in the first area. In some implementations, updating the loading status of the tile map not shared by the first area and the second area based on the distance parameter and the first area can include the use of indexes. For example, an index of a tile map that needs to be updated can be determined based on the distance parameter and indexes of tile maps in the first area. The loading status of the tile map of the virtual object in the virtual map can be updated based on the index of the tile map that needs to be updated.

In some implementations, method 1100 can further include the use of latitude and longitude coordinates in determining map coordinates of the virtual object. For example, before determining the distance parameter and updating the loading status of the tile map not shared by the first area and the second area based on the distance parameter and the first area, corresponding map coordinates of the virtual object in the virtual map can be determined based on a latitude and a longitude of an actual object that corresponds to the virtual object in an actual environment. Then, the virtual map can be generated based on an actual electronic map.

In some implementations, method 1100 can further include the use of action parameters. For example, before determining the distance parameter and updating the loading status of the tile map not shared by the first area and the second area based on the distance parameter and the first area, a corresponding action parameter of the virtual object in the virtual map can be determined, and the virtual object can be operated based on an action parameter of the actual object that corresponds to the virtual object in the actual environment.

In some implementations, method 1100 can further include the use of equally-sized tile areas in generating the tile maps in the virtual map. For example, the map area of the virtual map can be determined based on a scaling relationship between the actual electronic map and the virtual map. The map area can be divided into a plurality of equally-sized tile areas. Image processing can be performed on each tile area based on an area map that corresponds to the tile area in the actual electronic map. The image processing can generate a tile map of the tile area, and the image processing can include rendering processing.

In some implementations, performing image processing on each tile area based on the area map that corresponds to the tile area in the actual electronic map to generate the tile map of the tile area can include the following. A first actual area map can be determined that corresponds to a first tile area in the plurality of equally-sized tile areas in the actual electronic map based on a size of the tile area and an index of the first tile area. Image processing can be performed on the first tile area based on the first actual area map to obtain a first tile map that corresponds to the first tile area.

The present disclosure describes a method for improving the efficiency of displaying a virtual map. For example, after a virtual object moves out of a central area that the virtual object is located in, the virtual object moves into a tile map, and a distance parameter of the tile map that is relative to the central area is determined. Then, a tile map whose loading status needs to be updated is determined based on the distance parameter of the tile map and a currently loaded tile map. The techniques can be used, for example, in virtual reality (VR) gaming, where combining the use of map coordinates and action parameters can provide an improved consistency/virtual experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for updating tile maps in virtual maps, comprising:
   determining, in a first area, a central area in which a virtual object is located, wherein the first area comprises an area of a map that comprises tile maps loaded into a virtual map in which the virtual object is located, and wherein a border of the central area is located in the first area;
   determining a distance parameter after the virtual object moves out of the central area, wherein the distance parameter indicates relative distances of a first tile map in which the virtual object is located relative to the central area in an x-axis direction and a y-axis direction in a tile map coordinate system;
   updating a loading status of a plurality of tile maps that are in the first area or a second area, but are not shared by the first area and the second area, wherein the second area comprises a map area determined first area based on the distance parameter, updating the loading status of the plurality of tile maps comprising:
      determining that a second tile map in the plurality of tile maps lies outside the map area; and
      responsive to determining that the second tile map lies outside the map area, updating a loading status of the second tile map; and
   loading a subset of the plurality of tile maps, the subset excluding the second tile map.

2. The method of claim 1, wherein:
   a maximum distance between any tile map in the central area and the virtual object in the x-axis direction in the tile map coordinate system of the virtual map is less than $X_1$, wherein $X_1$ represents a predetermined positive integer;
   a maximum distance between any tile map in the central area and the virtual object in the y-axis direction in the tile map coordinate system is less than $Y_1$, wherein $Y_1$ represents a predetermined positive integer;
   a length of one tile map is used as a unit on the x-axis in the tile map coordinate system; and
   a width of one tile map is used as a unit on the y-axis in the tile map coordinate system.

3. The method of claim 1, wherein determining the distance parameter comprises:
   determining that the distance parameter is (1, 0) when the virtual object moves to a tile map that is on the right of the central area and adjacent to the central area; or
   determining that the distance parameter is (1, 1) when the virtual object moves to a tile map that is at the upper right of the central area and adjacent to the central area; or
   determining that the distance parameter is (0, 1) when the virtual object moves to a tile map that is right above the central area and adjacent to the central area; or
   determining that the distance parameter is (−1, 1) when the virtual object moves to a tile map that is at the upper left of the central area and adjacent to the central area; or
   determining that the distance parameter is (−1, 0) when the virtual object moves to a tile map that is on the left of the central area and adjacent to the central area; or
   determining that the distance parameter is (−1, 1) when the virtual object moves to a tile map that is at the lower left of the central area and adjacent to the central area; or
   determining that the distance parameter is (0, 1) when the virtual object moves to a tile map that is right below the central area and adjacent to the central area; or
   determining that the distance parameter is (1, −1) when the virtual object moves to a tile map that is at the lower right of the central area and adjacent to the central area, wherein the tile map is a rectangular area, the distance parameter (a, b) indicates that the central area moves to the right by a tile maps and upward by b tile maps, and x and y are integers.

4. The method of claim 1, wherein determining the distance parameter after the virtual object moves out of the central area and updating the loading status of the plurality of tile maps comprises:
   determining the distance parameter after the virtual object moves out of the central area for a time duration that exceeds a preset time; and
   updating the loading status of the plurality of tile maps based on the distance parameter.

5. The method of claim 1, wherein updating the loading status of the plurality of tile maps comprises:
   loading added tile maps in the second area relative to tile maps in the first area, and removing reduced tile maps in the second area relative to tile maps in the first area.

6. The method of claim 1, wherein updating the loading status of the plurality of tile maps comprises:
   determining an index of a tile map that needs to be updated based on the distance parameter and indexes of tile maps in the first area; and
   updating the loading status of the tile map of the virtual object in the virtual map based on the index of the tile map that needs to be updated.

7. The method of claim 1, further comprising:
   before determining the distance parameter and updating the loading status of the plurality of tile maps, determining corresponding map coordinates of the virtual object in the virtual map based on a latitude and a longitude of an actual object that corresponds to the virtual object in an actual environment, wherein the virtual map is generated based on an actual electronic map.

8. The method of claim 1, wherein updating the loading status of the plurality of tile maps comprises:
   determining that a third tile map in the plurality of tile maps lies within the map area; and
   responsive to determining that the third tile map lies outside the map area, updating a loading status of the third tile map; and
   including the third tile map in the subset of the plurality of tile maps.

9. A non-transitory, computer-readable medium storing one or more instructions executable by a computer system to perform operations comprising:
   determining, in a first area, a central area in which a virtual object is located, wherein the first area comprises an area of a map that comprises tile maps loaded into a virtual map in which the virtual object is located, and wherein a border of the central area is located in the first area;
   determining a distance parameter after the virtual object moves out of the central area, wherein the distance parameter indicates relative distances of a first tile map in which the virtual object is located relative to the central area in an x-axis direction and a y-axis direction in a tile map coordinate system;
   updating a loading status of a plurality of tile maps that are in the first area or a second area, but are not shared by the first area and the second area, wherein the second area comprises a map area determined based on the distance parameter, updating the loading status of the plurality of tile maps comprising:
      determining that a second tile map in the plurality of tile maps lies outside the map area; and
      responsive to determining that the second tile map lies outside the map area, updating a loading status of the second tile map; and
   loading a subset of the plurality of tile maps, the subset excluding the second tile map.

10. The non-transitory, computer-readable medium of claim 9, wherein:
   a maximum distance between any tile map in the central area and the virtual object in the x-axis direction in the tile map coordinate system of the virtual map is less than $X_1$, wherein $X_1$ represents a predetermined positive integer;
   a maximum distance between any tile map in the central area and the virtual object in the y-axis direction in the tile map coordinate system is less than $Y_1$, wherein $Y_1$ represents a predetermined positive integer;
   a length of one tile map is used as a unit on the x-axis in the tile map coordinate system; and
   a width of one tile map is used as a unit on the y-axis in the tile map coordinate system.

11. The non-transitory, computer-readable medium of claim 9, wherein determining the distance parameter comprises:
   determining that the distance parameter is (1, 0) when the virtual object moves to a tile map that is on the right of the central area and adjacent to the central area; or
   determining that the distance parameter is (1, 1) when the virtual object moves to a tile map that is at the upper right of the central area and adjacent to the central area; or
   determining that the distance parameter is (0, 1) when the virtual object moves to a tile map that is right above the central area and adjacent to the central area; or
   determining that the distance parameter is (−1, 1) when the virtual object moves to a tile map that is at the upper left of the central area and adjacent to the central area; or
   determining that the distance parameter is (−1, 0) when the virtual object moves to a tile map that is on the left of the central area and adjacent to the central area; or
   determining that the distance parameter is (−1, −1) when the virtual object moves to a tile map that is at the lower left of the central area and adjacent to the central area; or
   determining that the distance parameter is (0, −1) when the virtual object moves to a tile map that is right below the central area and adjacent to the central area; or
   determining that the distance parameter is (1, −1) when the virtual object moves to a tile map that is at the lower right of the central area and adjacent to the central area, wherein the tile map is a rectangular area, the distance parameter (a, b) indicates that the central area moves to the right by a tile maps and upward by b tile maps, and x and y are integers.

12. The non-transitory, computer-readable medium of claim 9, wherein determining the distance parameter after the virtual object moves out of the central area and updating the loading status of the plurality of tile maps comprises:
   determining the distance parameter after the virtual object moves out of the central area for a time duration that exceeds a preset time; and
   updating the loading status of the plurality of tile maps.

13. The non-transitory, computer-readable medium of claim 9, wherein updating the loading status of the plurality of tile maps comprises:

loading added tile maps in the second area relative to tile maps in the first area, and removing reduced tile maps in the second area relative to tile maps in the first area.

14. The non-transitory, computer-readable medium of claim 9, wherein updating the loading status of the plurality of tile maps comprises:
   determining an index of a tile map that needs to be updated based on the distance parameter and indexes of tile maps in the first area; and
   updating the loading status of the tile map of the virtual object in the virtual map based on the index of the tile map that needs to be updated.

15. The non-transitory, computer-readable medium of claim 9, the operations further comprising:
   before determining the distance parameter and updating the loading status of the plurality of tile maps, determining corresponding map coordinates of the virtual object in the virtual map based on a latitude and a longitude of an actual object that corresponds to the virtual object in an actual environment, wherein the virtual map is generated based on an actual electronic map.

16. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      determining, in a first area, a central area in which a virtual object is located, wherein the first area comprises an area of a map that comprises tile maps loaded into a virtual map in which the virtual object is located, and wherein a border of the central area is located in the first area;
      determining a distance parameter after the virtual object moves out of the central area, wherein the distance parameter indicates relative distances of a first tile map in which the virtual object is located relative to the central area in an x-axis direction and a y-axis direction in a tile map coordinate system;
      updating a loading status of a plurality of tile maps that are in the first area or a second area, but are not shared by the first area and the second area, wherein the second area comprises a map area determined based on the distance parameter, updating the loading status of the plurality of tile maps comprising:
         determining that a second tile map in the plurality of tile maps lies outside the map area; and
         responsive to determining that the second tile map lies outside the map area, updating a loading status of the second tile map; and
      loading a subset of the plurality of tile maps, the subset excluding the second tile map.

17. The computer-implemented system of claim 16, wherein:
   a maximum distance between any tile map in the central area and the virtual object in the x-axis direction in the tile map coordinate system of the virtual map is less than $X_1$, wherein $X_1$ represents a predetermined positive integer;
   a maximum distance between any tile map in the central area and the virtual object in the y-axis direction in the tile map coordinate system is less than $Y_1$, wherein $Y_1$ represents a predetermined positive integer;
   a length of one tile map is used as a unit on the x-axis in the tile map coordinate system; and
   a width of one tile map is used as a unit on the y-axis in the tile map coordinate system.

18. The computer-implemented system of claim 16, wherein determining the distance parameter comprises:
   determining that the distance parameter is (1, 0) when the virtual object moves to a tile map that is on the right of the central area and adjacent to the central area; or
   determining that the distance parameter is (1, 1) when the virtual object moves to a tile map that is at the upper right of the central area and adjacent to the central area; or
   determining that the distance parameter is (0, 1) when the virtual object moves to a tile map that is right above the central area and adjacent to the central area; or
   determining that the distance parameter is (−1, 1) when the virtual object moves to a tile map that is at the upper left of the central area and adjacent to the central area; or
   determining that the distance parameter is (−1, 0) when the virtual object moves to a tile map that is on the left of the central area and adjacent to the central area; or
   determining that the distance parameter is (−1, −1) when the virtual object moves to a tile map that is at the lower left of the central area and adjacent to the central area; or
   determining that the distance parameter is (0, −1) when the virtual object moves to a tile map that is right below the central area and adjacent to the central area; or
   determining that the distance parameter is (1, −1) when the virtual object moves to a tile map that is at the lower right of the central area and adjacent to the central area, wherein the tile map is a rectangular area, the distance parameter (a, b) indicates that the central area moves to the right by a tile maps and upward by b tile maps, and x and y are integers.

19. The computer-implemented system of claim 16, wherein determining the distance parameter after the virtual object moves out of the central area and updating the loading status of the plurality of tile maps comprises:
   determining the distance parameter after the virtual object moves out of the central area for a time duration that exceeds a preset time; and
   updating the loading status of the plurality of tile maps.

20. The computer-implemented system of claim 16, wherein updating the loading status of the plurality of tile maps comprises:
   loading added tile maps in the second area relative to tile maps in the first area, and removing reduced tile maps in the second area relative to tile maps in the first area.

21. The computer-implemented system of claim 16, wherein updating the loading status of the plurality of tile maps comprises:
   determining an index of a tile map that needs to be updated based on the distance parameter and indexes of tile maps in the first area; and
   updating the loading status of the tile map of the virtual object in the virtual map based on the index of the tile map that needs to be updated.

* * * * *

UNITED STATES PATENT AND TRADEMARK OFFICE
CERTIFICATE OF CORRECTION

PATENT NO. : 10,628,975 B2
APPLICATION NO. : 16/393802
DATED : April 21, 2020
INVENTOR(S) : Huan Liu and Rongyan Zheng Page 1 of 1

It is certified that error appears in the above-identified patent and that said Letters Patent is hereby corrected as shown below:

On the Title Page

Item (72), Delete "Hanzghou" and insert -- Hangzhou --, therefor,

In the Claims

Column 24/Line 14 (Approx.), In Claim 1, after "determined" delete "first area".

Signed and Sealed this
Seventh Day of December, 2021

Drew Hirshfeld
*Performing the Functions and Duties of the
Under Secretary of Commerce for Intellectual Property and
Director of the United States Patent and Trademark Office*